United States Patent [19]
Schmidt

[11] 3,917,078
[45] Nov. 4, 1975

[54] ELONGATE-MATERIAL TRANSPORT SYSTEM

[76] Inventor: Hans V. Schmidt, Mount Vista Road, Kingsville, Md. 21087

[22] Filed: May 28, 1974

[21] Appl. No.: 473,886

[52] U.S. Cl. .................................. 214/1 P; 198/82
[51] Int. Cl.² ........................................ B65G 37/00
[58] Field of Search ............ 214/1 P, 2.5; 198/20 R, 198/75, 78, 82, 105, 106, 107; 144/246 R, 246

[56] References Cited
UNITED STATES PATENTS

| | | | |
|---|---|---|---|
| 1,132,840 | 3/1915 | Garrett | 198/105 X |
| 2,657,784 | 11/1953 | Stoker | 198/105 X |
| 3,173,557 | 3/1965 | Elisassen | 198/78 X |
| 3,648,861 | 3/1972 | Fabian et al. | 198/105 X |
| 3,757,965 | 9/1973 | Renshaw | 214/1 P X |

FOREIGN PATENTS OR APPLICATIONS

| | | | |
|---|---|---|---|
| 487,562 | 6/1938 | United Kingdom | 198/20 R |

Primary Examiner—Frank E. Werner

[57] ABSTRACT

An elongate-material transport system including a cross transport for loading elongate material onto a roller way into which horizontal guide portions of the roller way extend; the cross transport has a power driven wagon system mounted on a horizontal guide system which is elevatable on a vertical guide system made jam-resistant by special contour of the moving portion, which is fixed to the horizontal guide portion; the roller conveyor has a longitudinal rail above one edge with a space beneath for receiving an end of the wagon system to align elongate material carried on the wagon system, and the wagon system has edges adapted for driving elongate members against the rail in aligning them.

18 Claims, 8 Drawing Figures

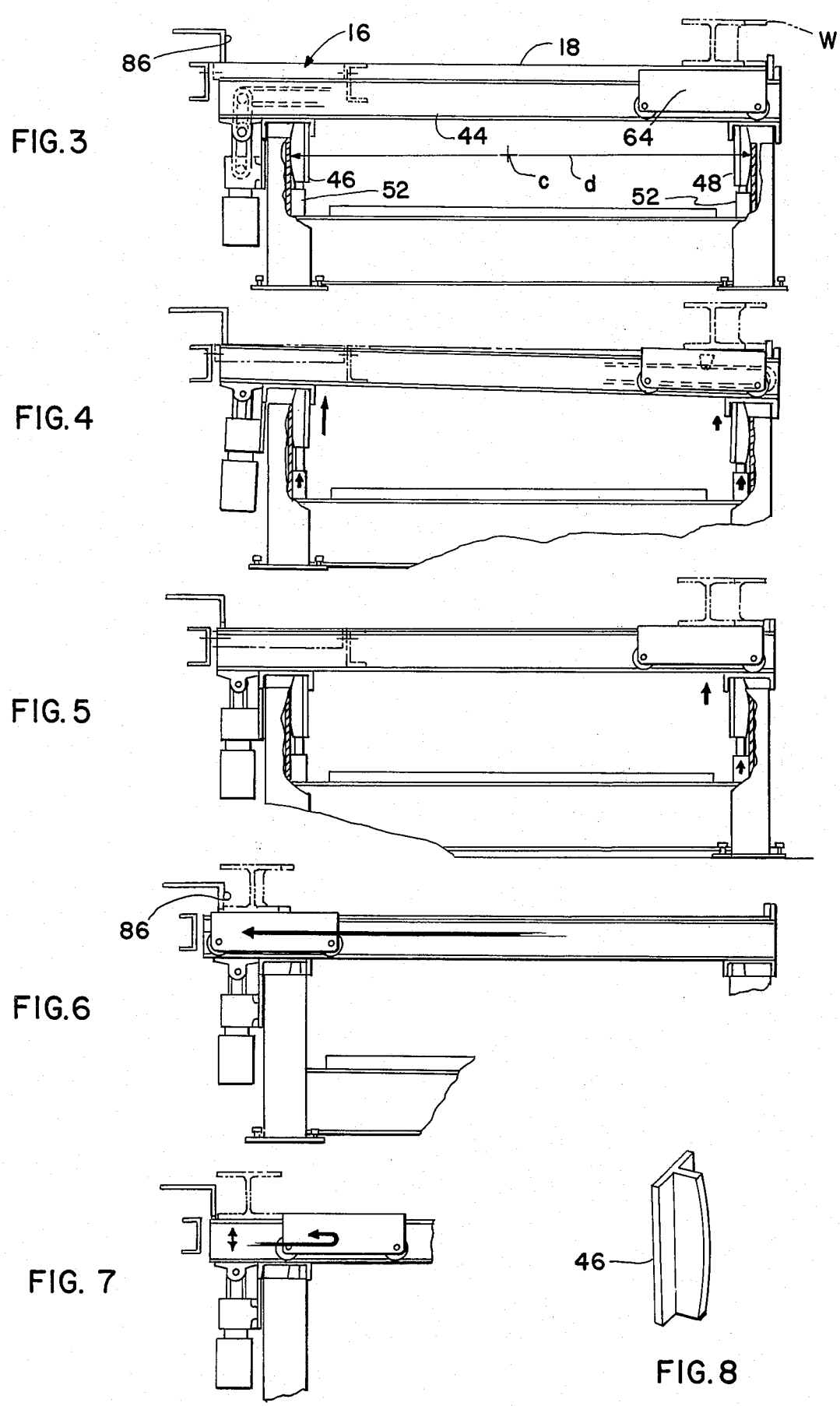

ELONGATE-MATERIAL TRANSPORT SYSTEM

This invention relates generally to materials handling and specifically to roller-conveyor systems for transporting beams and the like.

Principal objects of the invention are to provide a roller way and cross transport loading and unloading system of simple and economical construction which is nevertheless precise and versatile in operation, damage resistant, easy to fabricate, install, adjust, and operate, and which, importantly, is safe and quiet in operation and protects both the roller way and the materials loaded onto it and offloaded from it by the cross transport system.

In the prior art, numerous roller way and cross transport systems have been disclosed, some of which slide material transversely onto roller ways, others of which employ overhead cranes for roller way loading, but it is believed that no prior art system suggests the advantageous structure and operation of the present invention.

In brief summary given for cursive description only, the invention includes a roller conveyor intersected by a cross transport having a wagon system traversing a horizontal guide system elevatable by a powered vertical guide system having a contoured arrangement preventing jamming; both yielding and positive work-alignment modes are provided, together with self-guarded but accessible operating units.

The above and other objects and advantages of the invention will become more readily apparent from the following description, including the drawings, in which like reference numerals designate like parts:

FIGS. 3 through 7 are side elevation detail views, partly broken away and with intervening structure removed, of cross transport structure according to this invention, and FIG. 8 is an isometric detail of a portion of a T-section-contoured movable way.

Figure 1:
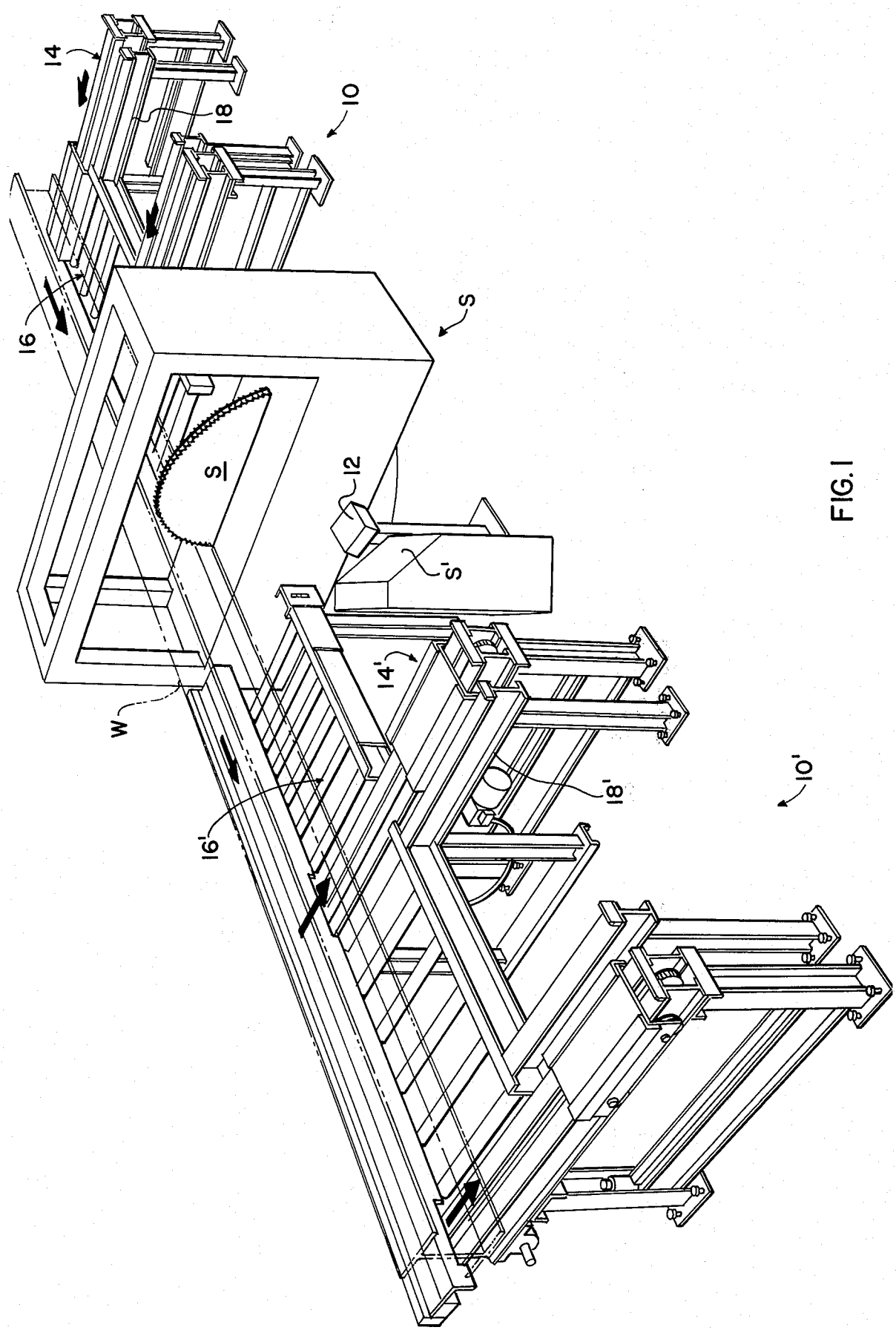
FIG. 1 is an isometric view of a circular cold sawing installation provided with a work transport system according to this invention.

In FIG. 1 two basically similar transport units 10, 10' respectively on the input and output sides of a representative circular cold saw S convey and position elongate material such as beam W for cut-off.

Panel S' provides means for operator control of the saw. Panel 12 provides for manual control of the transport system by an operator, including a powered mechanism, advancing work along the roller way.

In sequence of operation (arrows) a beam or other workpiece positioned on the first cross transport 14 is lifted by it and conveyed transversely over and deposited in alignment on the first roller way 16, along which it is then advanced on the rollers according to sawing schedule. Following the sawing operation, the cut pieces are advanced per schedule along the second roller way to an offloading position at which point second cross transport 14' lifts them in turn and conveys them transversely from the roller way. To aid both loading and offloading operations, a work support 18 is fixed at a level for loading and offloading by the lifting and horizontally moving mechanisms of the cross transport.

Figure 2:
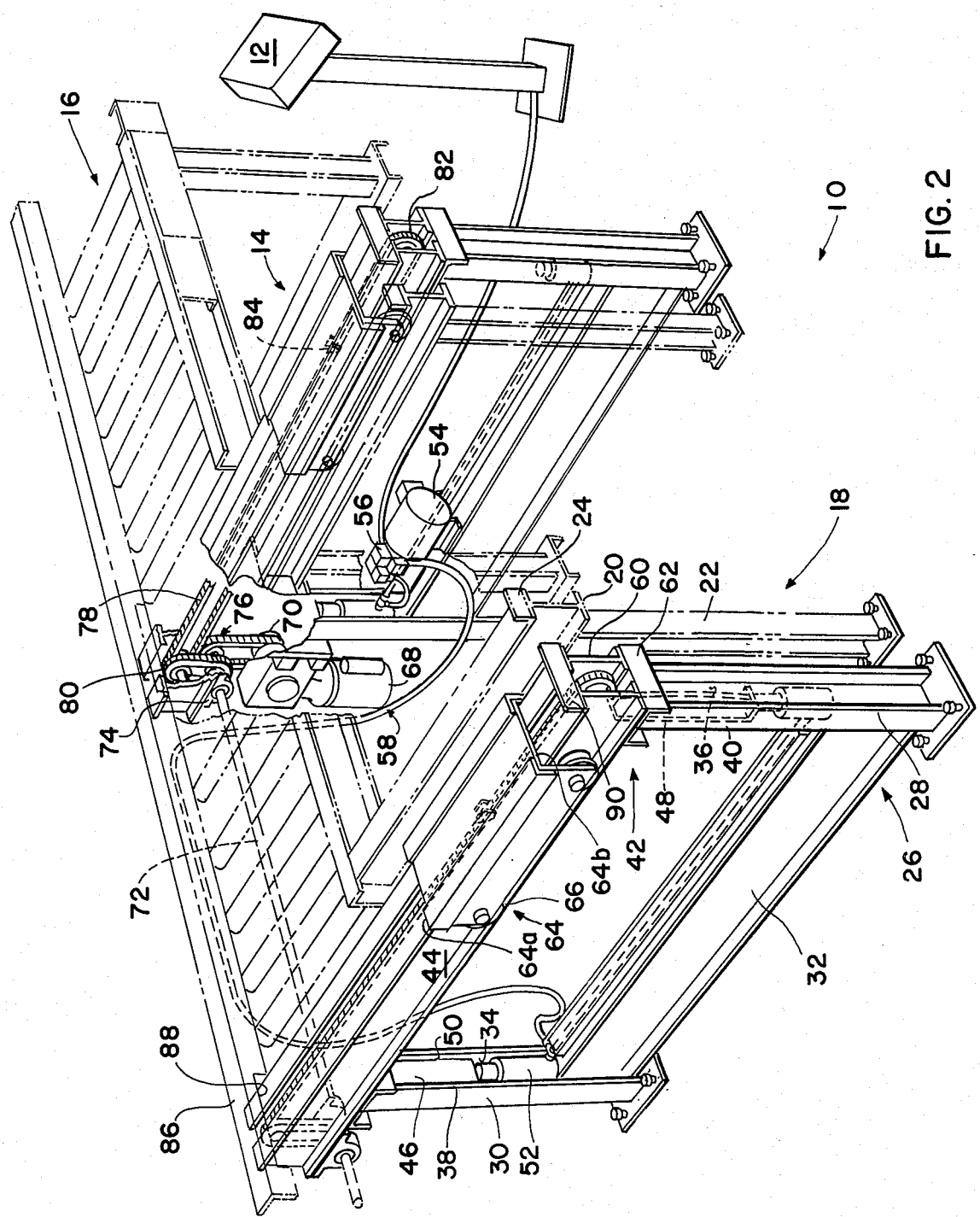
FIG. 2 is an isometric view partly in section and partly in phantom lines of a roller way and cross transport assembly of this invention.

FIG. 2 illustrates the lifting and horizontally moving mechanisms in relation to other parts of a transport unit 10.

The work support 18 preferably has a pair of spaced horizontal beams 20, which may be I-beams, extending flush with the upper part of and perpendicularly from the side of the roller way 16, forming in plan view an unobstructed "U" giving safe access to the area. Fixed length legs 22 support the free ends of the horizontal beams. A stop 24 is welded to each horizontal beam upper surface at the free end.

Similar lifting-and-depositing subassemblies of the cross transport system are located along each side of the work support and are connected by a pair of drive systems.

Each subassembly includes a fixed vertical guide assembly 26 having a pair of uprights 28, 30 united in parallel spacing by a cross member 32 connecting the lower ends, forming in side elevation an upwardly open squared U-shape. The uprights, which may be I-beams, have facing planar webs 34, 36 respectively bounded by first and second pairs of vertical planar flanges 38, 40, the whole effectively comprising in plan a pair of facing U-section channels.

Each subassembly also includes a movable vertical guide assembly 42 in the general form of a downwardly open squared U-shape, including a horizontal guide 44 having at each end a respective downwardly extending member 46, 48.

Each downwardly extending member is preferably formed of a T-section beam with the ends of the T-section crossbars as at 50 engaging the inner faces of the flanges of the fixed uprights, and with the ends of the T-section shanks having a vertical curvature to be described and engaging the facing webs of the fixed uprights. The U-shape of the movable vertical guide assembly thus nests upside down in the U-shape of the fixed vertical guide assembly, as viewed in side elevation.

Vertically extendable hydraulic actuators 52 rest on respective ends of member 32 and engage the lower ends of the downwardly extending members. The hydraulic actuators may economically be single acting, with gravity return on relief of pressure in a common hydraulic supply 54 as by a solenoid-actuated bypass valve 56 connected in a conventional hydraulic pressure system 58, manually controlled from console 12.

Each horizontal guide 44 preferably comprises a pair of I-beams 60 fixed in side-by-side parallel spacing with the webs vertical, and connects with the downwardly extending members below by means of caps 62 which also serve to guard the upper ends of the uprights. Each horizontal guide has a wagon 64 in the form of a structural channel disposed over it with the flanges extending downward on either side. A pair of flanges wheels 66 rotatably secured inside each flange engages inner surfaces of the I-beam flanges.

Stroke of the hydraulic actuation system is made sufficient to produce a rise of the upper surface of the wagons to a position about one-half inch above the work support, and a fall to a position about one-half inch below the top tangent to the rollers in the roller way.

Wagon drive consists of panel-controlled motor 68 and clutch 70 which turn a shaft 72 mounted in shaft hangers 74 along the roller way. A conventional sprocket and endless chain arrangement 76 drives a horizontal endless chain 78 held between sprockets 80, 82 in the ends to the horizontal guide system between the I-beams, and a clamp 84 connects each wagon with the respective endless chain.

As will be described in relation to the following Figures, a work guide rail 86 fixed along the roller way above the end of the cross transport system has clearance as at apertures 88, permitting the ends of the wagons to pass beneath, causing workpieces carried on the wagons to slide on them and align with the guide rail; workpieces can also be driven against the rail using the upright forward edge 64a of the wagon for the purpose. The upright rearward edge 64b of the wagon can be used to drive and align workpieces against the fixed stops 90 on the ends of the horizontal guides and the stops on the supports.

FIGS. 3–7 diagram a cycle of operation in which a workpiece W is cross-transported and aligned against guide rail 86.

In FIG. 3 a workpiece W has been set on the work support 18 in misalignment with the long axis of the roller way 16. To cross-transport it and align it, the operator first causes actuators 52 to raise the movable vertical guide assembly including the horizontal guide 44 and wagon 64, by pressing upwardly on downwardly extending members 46, 48 fixed to the horizontal guide.

Should one end of the horizontal guide tend to rise before the other because of excessive weight or for any other reason, as in FIG. 4, this brings into play the previously mentioned anti-jamming feature resulting from contour of the outermost or endmost edge of each T-section downwardly extending members 46, 48. Each of these edges has in the vertical plane an outwardly convex arc shape, the arcs at the opposite ends of each horizontal guide having a common center c substantially midway of a diameter d passing through the arcs, resulting in a constant-diameter profile being presented to the parallel vertical surfaces of the fixed portion of the assembly, absolutely preventing jamming, going up or down.

As shown in FIG. 5, the lagging end thus rises without frictional binding, lifts and transports the work-piece, and aligns it against the guide rail 86 as the end of the wagon passes beneath, as in FIG. 6.

Should the misalignment be too great to be completely cured in this manner, the wagon is lowered, moved from under the workpiece, raised, and rammed against the workpiece as in FIG. 7, positively aligning it regardless of degree of misalignment. Wagon length preferably equals the width of the conveyor, as shown, to match the capacities.

FIG. 8 illustrates the compactness and rigidity of the contoured T-section members 46. The inwardly offset position of the side guide edges, or ends of the T-section crossbar, relative to the curved edge minimizes the amount of material to be machined in curving the curved edge.

In conclusion, it can be seen how the design of the transport system of this invention makes it easy to construct, adjust and maintain, with no field-adjustement parallel-sliding fits to jam, how the design makes the system relatively silent and longwearing, by nearly eliminating workpiece sliding with the attendant noise and roller wear, and how the design makes the system safe and easy to use and maintain by reducing power necessary to operate it by eliminating potential springbacks, and by self-housing the operating parts safely but accessibly.

Obviously many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. In a material transport system having a roller way for advancing elongate stock longitudinally therealong and elevatable cross transport system structure for transversely loading elongate stock onto the roller way, the improvement comprising a cross transport system including: means for supporting elongate stock longitudinally parallel with the roller way length, means for lifting elongate stock from the supporting means and depositing in longitudinal alignment with the roller way length on the roller way said elongate stock lifted, including: vertical guiding means having a fixed portion, including a pair of uprights having respective first vertical planar surfaces facing in parallel-spaced relation; and a vertically movable portion including structure defining a pair of surfaces extending downwardly as respective outwardly convex arcs positioned for engaging said respective first vertical planar surfaces, means for raising the movable portion of the vertical guiding means, horizontal guiding means integrally affixed as part of the movable portion of the vertical guiding means, one end of the horizontal guiding means extending transversely through the roller way, a wagon on the horizontal guiding means, means for moving the wagon along the horizontal guiding means, means for lowering the movable portion of vertical guiding means; and means for aligning elongate stock longitudinally with the length of the roller way.

2. In a material transport system as recited in claim 1, said outwardly convex arcs having a common center substantially midway of a diameter passing therethrough, and means for maintaining alignment between said vertical guiding means fixed and movable portions.

3. In a material transport system as recited in claim 2, said means for maintaining alignment comprising facing second and third vertical surfaces in substantial perpendicular disposition to the respective first vertical surfaces at each of said uprights for engagement by the movable portion of the vertical guiding means.

4. In a material transport system as recited in claim 3, the movable portion of the vertical guiding means having a respective lateral portion for engaging each of said second and third vertical surfaces, all said lateral portions being located inwardly of said respective convex arcs.

5. In a material transport system as recited in claim 4, each said vertical surface forming a portion of a squared U-shaped channel, each said outwardly convex portion being formed on the end of a T-section member shank, and each said lateral portion being an end of a said T-section member crossbar.

6. In a material transport system as recited in claim 5, said means for raising comprising a respective hydraulic actuator assembly engaging the lower end of each said T-section member, and means for pressurizing all said hydraulic actuators.

7. In a material transport system as recited in claim 6, the means for lowering the movable portion of the vertical guiding means comprising means for releasing pressure on all said hydraulic actuators.

8. In a material transport system as recited in claim 7, wherein the horizontal guiding means comprises first and second structural shapes fixed in side-by-side parallel-spacing with the webs vertical, wherein the wagon comprises a structural channel disposed over the horizontal guiding means with the flanges extending downward on either side thereof and with a plurality of wheels rotatably secured inside said wagon flanges and engaging inner surfaces of out-turned flanges of said first and second structural shapes, wherein the means for moving the wagon comprises a flexible elongate member having connection with the wagon in said space between the first and second structural shapes and means for urging said flexible elongate member.

9. In a material transport system as recited in claim 8, wherein the horizontal guiding means has fixed therebeneath a cap over the end of each upright member, with a said T-section member affixed to each respective cap.

10. In a material transport system as recited in claim 2, said supporting means having a height substantially equal to the height of the roller way, the raising of the movable portion of the vertical guiding means positioning the upper surface of the wagon proximately above the supporting means and roller way, and said lowering of the movable portion of the vertical guiding means positioning the upper surface of the wagon proximately below the roller top level in the roller way.

11. In a material transport system as recited in claim 2 the means for lifting elongate stock from the supporting means and depositing in longitudinal alignment with the roller way length on the roller way said elongate stock lifted comprising a pair of similar subassemblies spaced apart and including, common thereto, a hydraulic system for said lifting and a said means for moving the wagon.

12. In a material transport system as recited in claim 11, wherein the supporting means forms in plan a U-shape, with the base of the U at the roller way, and wherein said pair of similar subassemblies are located respectively on opposite sides of said supporting means.

13. In a material transport system as recited in claim 2, wherein the means for aligning comprises a rail affixed longitudinally above one side of the roller way and an end of the horizontal guiding means proximate thereto and having a space beneath said rail sufficient for an end of said wagon to pass therebeneath with the movable portion of the vertical guiding means in the raised position, the proportions providing for elongate stock carried on said wagon to be aligned against said rail and to slide on said wagon.

14. In a material transport system as recited in claim 13, said space being an aperture in the lower edge of the rail.

15. In a material transport system as recited in claim 13, wherein the means for aligning additionally comprises one end on the wagon having a vertical edge proportioned for driving elongate stock against said rail.

16. In a material transport system as recited in claim 15, wherein both ends of the carriage have said vertical edges.

17. In a material transport system as recited in claim 2, wherein the fixed portion of the vertical guiding means comprises in side elevation an upwardly open square-U-shape, and wherein the movable portion of the vertical guiding means comprises in side elevation a downwardly open square-U-shape fitted within the fixed portion of the vertical guiding means.

18. In a material transport system having a roller way for advancing elongate stock longitudinally therealong and a cross transport system having elevatable structure for loading elongate stock onto the roller way, the improvement comprising said cross transport system having: means for supporting elongate stock longitudinally parallel with the roller way length, means for lifting elongate stock from the supporting means and depositing on the roller way in longitudinal alignment with the roller way length said elongate stock lifted, including: horizontal guiding means, a respective outwardly convex structure extending from the horizontal guiding means proximate each end thereof, fixed upright structure guiding all said outwardly convex structure, a wagon on the horizontal guiding means, means for moving the wagon along the horizontal guiding means, and means for raising and lowering the horizontal guiding means.

* * * * *